US010381668B2

(12) United States Patent
Naganuma et al.

(10) Patent No.: US 10,381,668 B2
(45) Date of Patent: Aug. 13, 2019

(54) OPERATION CONTROL METHOD OF FUEL CELL AND OPERATION CONTROL APPARATUS OF FUEL CELL

(71) Applicant: TOYOTA JIDOSHA KABUSHIKI KAISHA, Toyota-shi, Aichi-ken (JP)

(72) Inventors: Yoshiaki Naganuma, Toyota (JP); Masashi Toida, Nagoya (JP); Tomohiro Ogawa, Toyota (JP); Tsuyoshi Maruo, Toyohashi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 273 days.

(21) Appl. No.: 14/919,993

(22) Filed: Oct. 22, 2015

(65) Prior Publication Data
US 2016/0133967 A1    May 12, 2016

(30) Foreign Application Priority Data
Nov. 10, 2014    (JP) ................... 2014-227684

(51) Int. Cl.
| | |
|---|---|
| H01M 8/04 | (2016.01) |
| H01M 8/04746 | (2016.01) |
| H01M 8/04858 | (2016.01) |
| H01M 8/0432 | (2016.01) |

(52) U.S. Cl.
CPC ..... H01M 8/04753 (2013.01); H01M 8/0488 (2013.01); H01M 8/0491 (2013.01); H01M 8/04373 (2013.01)

(58) Field of Classification Search
CPC ......... H01M 8/04753; H01M 8/04223; H01M 8/04225; H01M 8/0488; H01M 8/0491
See application file for complete search history.

(56) References Cited

U.S. PATENT DOCUMENTS

2010/0291447 A1*  11/2010  Imanishi ........... H01M 8/04268
                                                          429/429
2012/0003557 A1    1/2012  Tanaka et al.

FOREIGN PATENT DOCUMENTS

| CA | 2 640 589 A1 | 12/2000 |
|---|---|---|
| JP | 2006-156181 A | 6/2006 |
| JP | 2010-020923 A | 1/2010 |
| JP | 2010-186599 | 8/2010 |

* cited by examiner

*Primary Examiner* — Ula C Ruddock
*Assistant Examiner* — Frank A Chernow
(74) *Attorney, Agent, or Firm* — Finnegan, Henderson, Farabow, Garrett & Dunner, LLP

(57) ABSTRACT

The operation control method of a fuel cell includes acquiring a startup temperature of the fuel cell; acquiring a present temperature of the fuel cell; setting a present target operation point of the fuel cell that is identified by an output voltage value and an output current value based on the startup temperature, or based on the startup temperature and the present temperature; controlling at least one of the flow of the reaction gas supplied to the fuel cell, and an output voltage of the fuel cell so that the operation point of the fuel cell becomes the target operation point, and setting the target operation point includes a process of setting an operation point having a low output voltage value as the target operation point when the startup temperature is low as compared to the case when the startup temperature is high, if the present temperature is the same.

6 Claims, 6 Drawing Sheets

OPERATION CONTROL METHOD OF FUEL CELL AND OPERATION CONTROL APPARATUS OF FUEL CELL

CROSS-REFERENCE TO RELATED APPLICATIONS

The present application claims the priority based on the Japanese Patent Application No. 2014-227684 filed on Nov. 10, 2014, the entirety of disclosure of which is hereby incorporated by reference into this application.

BACKGROUND

Field

The present invention relates to operation control of a fuel cell.

Related Art

A technology has been proposed by which in order to improve stability during startup of a fuel cell in a low-temperature environment such as below the ice point, the waste heat is increased by operating the fuel cell at a lower efficiency than during normal operation, and the fuel cell is heated up in a short period of time. In the fuel cell system according to JP2010-186599A, the volume of the remaining water in the fuel cell is determined based on the impedance of the fuel cell measured during startup or the amount of scavenging air, and if the volume of the remaining water is high and the temperature of the fuel cell during startup is low, the low-efficiency operation is performed while stopping the circulation of the cooling medium inside the fuel cell.

However, the inventors of the application find out a new problem in that if the voltage value of the target operation points of the fuel cell during low efficiency operation is high, the amount of water that is generated until the fuel cell heats up and exceed the ice point becomes large, and the waste heat becomes less, because of which the generated water freezes and the diffusion of reaction gas inside the fuel cell declines, resulting in a significant decline in the output stability of the fuel cell. Moreover, when the present temperature of the fuel cell is the same, but the startup temperature is below the ice point and thus at a relatively low value, the problem of re-freezing also occurs.

SUMMARY

The present invention has been realized to resolve at least some of the above-described problems, and may be implemented in the aspects described below.

(1) According to a form of the present invention, an operation method of a fuel cell system is provided. The method includes acquiring a startup temperature of the fuel cell, acquiring a present temperature of the fuel cell, setting a target operation point of the fuel cell identified by an output voltage value and an output current value of the fuel cell based on the startup temperature or based on the startup temperature and the present temperature, and controlling at least one of a flow rate of a reaction gas supplied to the fuel cell, and an output voltage of the fuel cell so that the operation point of the fuel cell becomes the target operation point, wherein the setting the target operation point includes setting an operation point having a low output voltage value as the target operation point when the startup temperature is low as compared to the case when the startup temperature is high, if the present temperature is the same. According to the operation control method of the fuel cell of this aspect, since a target operation point having a low output voltage value is set when the startup temperature is low as compared to the case when the startup temperature is high, as long as the present temperature is the same, the amount of water generated in the fuel cell may be reduced as compared to a configuration in which a target operation point having a constant output voltage value is set regardless of the startup temperature if the present temperature is the same and a configuration in which a target operation point having a high output voltage value is set when the startup temperature is low as compared to the case when the startup temperature is high, if the present temperature is the same. Freezing of the generated water may be prevented by further increasing the waste heat amount. Therefore, the decline in the diffusion of the reaction gas during startup of the fuel cell in a low-temperature environment may be prevented.

(2) In operation control method of the fuel cell of the above aspect, the setting the target operation point includes setting an operation point having a high output voltage value as the target operation point when the present temperature is high as compared to the case when the present temperature is low, if the startup temperature is the same. The higher the present temperature, the lesser the amount of heat required for heating up the fuel cell up to a predetermined temperature. Therefore, according to the operation control method of the fuel cell of this aspect, since an operation point having a high output voltage value is set as the target operation point when the present temperature is high as compared to the case when the present temperature is low if the startup temperature is the same, the fuel cell may be made to perform a high-efficiency operation as compared to a configuration in which the output voltage value of the target operation point is set to a constant value regardless of the value of the present temperature. Therefore, a decline in the fuel consumption of the fuel cell may be prevented.

(3) In operation control method of the fuel cell of the above aspect, setting the target operation point is executed when the startup temperature is 0 degrees Celsius or below. According to the operation control method of the fuel cell of this aspect, the process of setting the target operation point is executed when the generated water freezes and the gas diffusion tends to be low since the startup temperature is 0 degrees Celsius or below, because of which the decline in gas diffusion due to freezing of the generated water may be prevented with higher certainty.

(4) In operation control method of the fuel cell of the above aspect, the setting the target operation point includes setting the target operation point so that the output voltage value of the target operation point becomes less than the output voltage value of a normal operation point that is an intersecting point of an iso-power curve passing through the target operation point and a current-voltage characteristic curve of the fuel cell. According to the operation control method of the fuel cell of this aspect, since an operation point having a low output voltage value is set as the target operation point rather than an operation point on the current-voltage characteristic curve, a large amount of waste heat may be obtained as compared to the case when the operation point of the fuel cell is a normal operation point, in the control process. Therefore, freezing of generated water may be further prevented.

(5) In operation control method of the fuel cell of the above aspect, the controlling includes a process where as compared to a case in which the operation point of the fuel cell matches the normal operation point, the flow of the reaction gas supplied to the fuel cell is reduced, and a low-efficiency operation in which the power loss is high as compared to the operation at the normal operation point is executed. According to the operation control method of the fuel cell of this aspect, since the low-efficiency operation is performed by reducing the amount of reaction gas, the amount of waste heat of the fuel cell may be increased.

(6) The operation control method of the fuel cell of the above aspect further includes storing beforehand, in a storage apparatus, an upper-limit value of an output voltage value of the target operation point corresponding to the startup temperature and the present temperature, wherein the storing includes storing a low value as the upper-limit value in the storage apparatus when the startup temperature is low as compared to the case when the startup temperature is high, if the present temperature is the same, and the setting the target operation point includes a process of setting the target operation point so that the output voltage value of the target operation point becomes equal to or less than the upper-limit value of the output voltage value that is identified by the startup temperature and the present temperature. According to the operation control method of the fuel cell of this aspect, since a low value is set as the upper-limit value of the output voltage value of the target operation point when the startup temperature is low as compared to the case when the startup temperature is high, the possibility of a target operation point having a low output voltage value being set, when the startup temperature is low as compared to the case when the startup temperature is high as long as the present temperature is the same, may be improved.

The present invention may be implemented in other various aspects. For example, the present invention may be implemented in aspects, such as a method of setting a target operation point of a fuel cell; a fuel cell system; and a fuel cell vehicle mounted with a fuel cell system.

DESCRIPTION OF EMBODIMENTS

Figure 1:
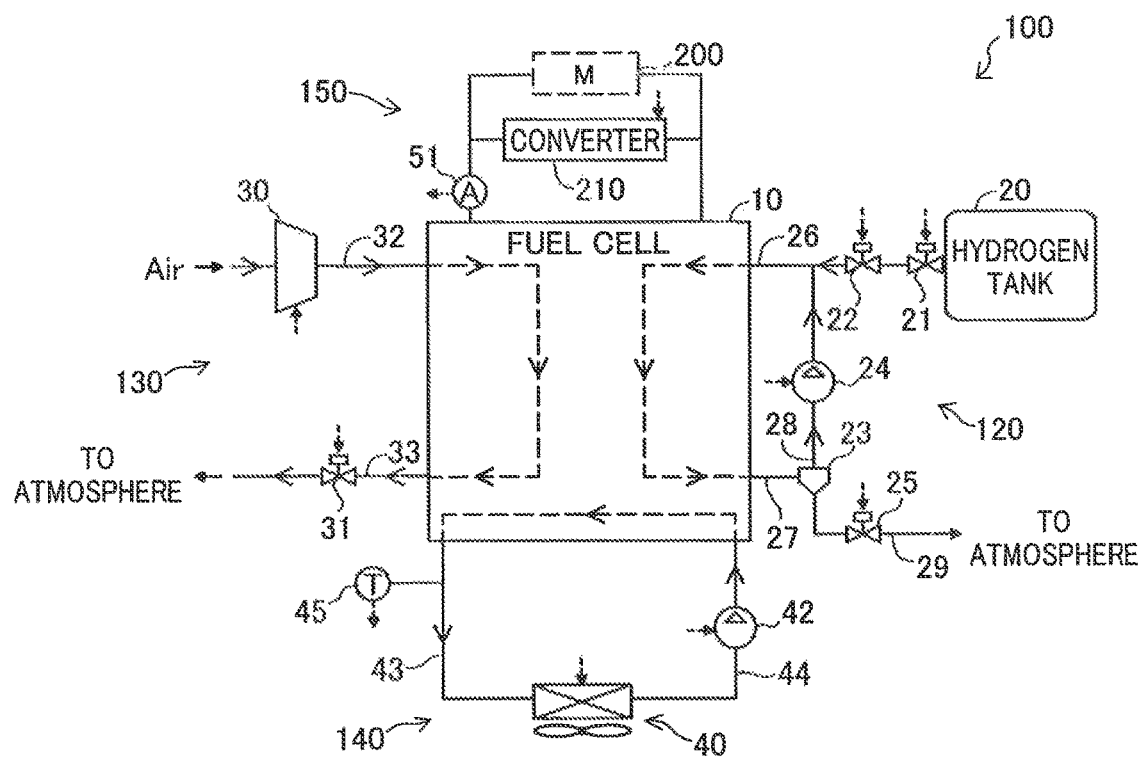
FIG. 1 is a block diagram showing a schematic configuration of a fuel cell system in which an operation control method of a fuel cell is applied as a first embodiment of the present invention.
Figure 1:
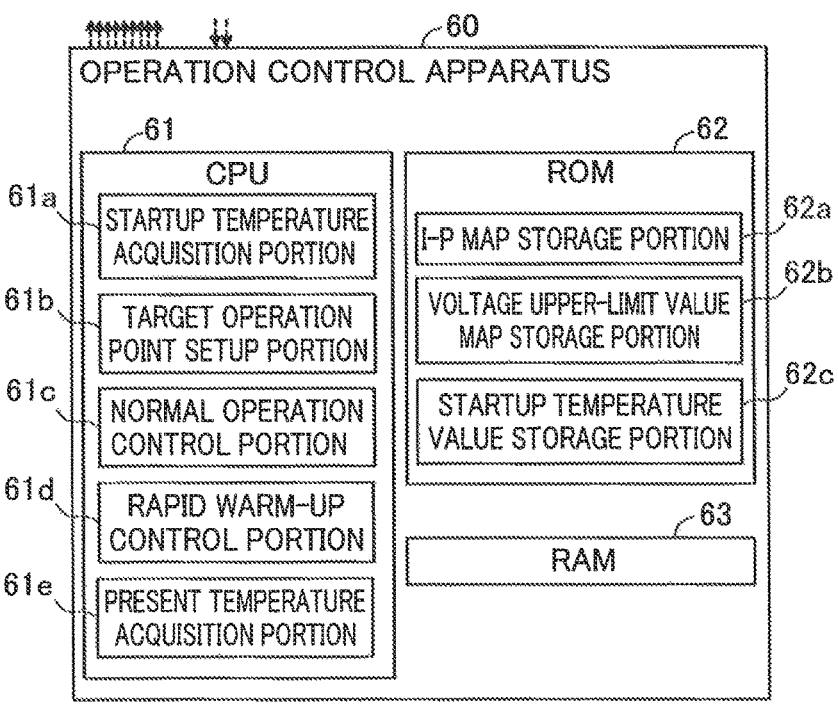

A. Embodiment
A1. System Configuration:
FIG. 1 is a block diagram showing a schematic configuration of a fuel cell system in which an operation control method of a fuel cell is applied as a first embodiment of the invention. In the present embodiment, the fuel cell system 100 is used as a system for supplying the drive power mounted on a fuel cell vehicle. The fuel cell system 100 includes a fuel cell 10, a fuel gas supply and discharge system 120, an oxidizing gas supply and discharge system 130, a cooling medium circulation system 140, a power supply system 150, and an operation control apparatus 60.

The fuel cell 10 is a so-called polymer electrolyte fuel cell, which includes a plurality of unit cells stacked along a predetermined direction, a pair of current collecting plates that function as integrated electrodes, and a pair of end plates arranged at the outer side of both ends of a fuel cell stack in order to maintain the stacking condition of the fuel cell stack made of the plurality of unit cells and the pair of current collecting plates. Each unit cell includes a solid polymer electrolyte membrane, an anode-side catalyst electrode layer and a cathode-side catalyst electrode layer. The anode-side catalyst electrode layer and the cathode-side catalyst electrode layer sandwich the solid polymer electrolyte membrane. Each unit cell generates power through an electrochemical reaction between hydrogen, which is a fuel gas supplied to an anode-side catalyst electrode layer, and oxygen included in the air, which is an oxidizing gas supplied to a cathode-side catalyst electrode layer. The catalyst electrode layer includes a catalyst, such as carbon particles carrying platinum (Pt), and an electrolyte. In the unit cell, a gas diffusion layer formed by a porous body is arranged at the outer side of the catalyst electrode layer at both electrode sides. A carbon porous body, such as a carbon paper and carbon cloth, etc., or a metallic porous body, such as a metal mesh or foam metal, etc. may be used as the porous body, for example. Inside the fuel cell 10, a manifold, not shown in the diagram, for circulating the fuel gas, the oxidizing gas, and the cooling medium is formed along the stacking direction of the unit cell.

The fuel gas supply and discharge system 120 performs supply of the fuel gas to the fuel cell 10, and discharge of the anode-side off gas from the fuel cell 10. The fuel gas supply and discharge system 120 includes a hydrogen tank 20, a cut-off valve 21, an injector 22, a gas-liquid separator 23, a circulation pump 24, a purge valve 25, a fuel gas supply path 26, a first fuel gas discharge path 27, a fuel gas circulation path 28, and a second fuel gas discharge path 29.

The hydrogen tank 20 stores high-pressure hydrogen, and supplies hydrogen gas as fuel gas to the fuel cell 10 via the fuel gas supply path 26. The cut-off valve 21 is arranged near a discharge port of the fuel gas in the hydrogen tank 20, and switches between supplying and stopping the supply of hydrogen gas from the hydrogen tank 20. The injector 22 is arranged in the fuel gas supply path 26, and adjusts the supply amount and pressure of hydrogen gas to the fuel cell 10. The gas-liquid separator 23 is arranged in the first fuel gas discharge path 27, and separates the water included in the off gas discharged from the fuel cell 10 and discharges it to the second fuel gas discharge path 29, and at the same time, discharges the gas after separation of water, that is, the fuel gas, to the fuel gas circulation path 28. The circulation pump 24 is arranged in the fuel gas circulation path 28, and supplies the fuel gas discharged from the gas-liquid separator 23 to the fuel gas supply path 26. The purge valve 25 is arranged in the second fuel gas discharge path 29, and when opened, allows the discharge of the water separated by the gas-liquid separator 23 to the atmosphere.

The oxidizing gas supply and discharge system 130 performs supply of the oxidizing gas to the fuel cell 10, and discharge of the cathode-side off gas from the fuel cell 10. The oxidizing gas supply and discharge system 130 includes an air cleaner 30, a back pressure regulating valve 31, an oxidizing gas supply path 32, and an oxidizing gas discharge path 33. The air compressor 30 compresses the air that is sucked in from the atmosphere and supplies it to the oxidizing gas supply path 32. The back pressure regulating valve 31 is arranged in the oxidizing gas discharge path 33, and adjusts the so-called back pressure, which is the pressure at the cathode discharge side in the fuel cell 10.

The cooling medium circulation system 140 adjusts the temperature of the fuel cell 10 by circulating the cooling medium via the fuel cell 10. The cooling medium circulation system 140 includes a radiator 40, a cooling medium discharge path 43, a cooling medium supply path 44, a circulation pump 42, and a temperature sensor 45. The radiator 40 is connected to the cooling medium discharge path 43 and the cooling medium supply path 44, and cools the cooling medium flowing in from the cooling medium discharge path 43 with the help of the air blast from an electrically driven fan, and discharges it to the cooling medium supply path 44. The cooling medium discharge path 43 is connected to a cooling medium discharge manifold inside the fuel cell 10. The cooling medium supply path 44 is connected to a cooling medium supply manifold inside the fuel cell 10. Therefore, the circulation path of the cooling medium is formed by the cooling medium discharge path 43, the radiator 40, the cooling medium supply path 44, and the manifold inside the fuel cell 10. The temperature sensor 45 is arranged near the fuel cell 10 in the cooling medium discharge path 43. The temperature sensor 45 measures the temperature of the cooling medium discharged from the fuel cell, and outputs a signal showing the temperature value. In the present embodiment, the temperature measured in the cooling medium discharge path 43 is handled as the temperature of the fuel cell 10.

The power supply system 150 supplies the power output from the fuel cell 10 to a motor 200 as a load. The power supply system 150 includes a DC-DC converter 210 and an ammeter 51. The DC-DC converter 210 is electrically connected to the current collecting plates (not shown in the drawing) of the fuel cell 10. The DC-DC converter 210 controls the output voltage of the fuel cell 10. The ammeter 51 measures the current value of the fuel cell 10.

The operation control apparatus 60 is electrically connected to an air compressor 30, two circulation pumps 24 and 42, a radiator 40, a DC-DC converter 210, an injector 22, and three valves 21, 25, and 31, and performs control thereof. Moreover, the operation control apparatus 60 is electrically connected to a temperature sensor 45 and an ammeter 51, and receives a signal indicating a temperature value output from the temperature sensor 45, and a signal indicating a current value output from the ammeter 51. The operation control apparatus 60 includes a Central Processing Unit (CPU) 61, a Read Only Memory (ROM) 62, and a Random Access memory (RAM) 63. A control program (not shown in the drawing) for controlling the fuel cell system 100 is stored in the ROM 62. By executing the control program while using the RAM 63, the CPU 61 functions as a startup temperature acquisition portion 61a, a target operation point setup portion 61b, a normal operation control portion 61c, a rapid warm-up control portion 61d, and a present temperature acquisition portion 61e.

On the basis of a signal received from the temperature sensor 45 immediately after the startup of the fuel cell 10, the startup temperature acquisition portion 61a stores, in the ROM 62, the temperature value shown by the signal as the startup temperature of the fuel cell 10 (hereinafter referred to as the "startup temperature").

The target operation point setup portion 61b sets the operation point, which is the target during the control of the fuel cell 10 (hereinafter referred to as the "target operation point"). In the present embodiment, the operation point of the fuel cell 10 is identified by the output voltage and the output current of the fuel cell 10.

The normal operation control portion 61c computes the energy required by auxiliary devices such as the air compressor 30, and the motor 200 on the basis of the accelerator opening and vehicle speed. Moreover, the normal operation control portion 61c performs normal operation control in the operation control process described later. In the normal operation control, the amount of power generated by the fuel cell 10 is controlled by controlling the amount of air and the hydrogen gas, which are the reaction gases supplied to the fuel cell 10, the circulation flow rate of the cooling medium in the fuel cell 10, and the voltage of the fuel cell 10. Specifically, the normal operation control portion 61c controls the air compressor 30, the injector 22, the circulation pump 42, and the DC-DC converter 210 so that the operation point of the fuel cell 10 becomes the target operation point on the I-V characteristic curve (the current-voltage characteristic curve) of the fuel cell 10. At this time, the amount of supply of air to the fuel cell 10 is adjusted by controlling the rotation speed of the air compressor 30. Moreover, the amount of supply of hydrogen gas to the fuel cell 10 is adjusted by controlling the injector 22. Moreover, the circulation flow rate of the cooling medium in the fuel cell 10 is adjusted by controlling the circulation pump 42. Also, the output voltage value of the fuel cell 10 is adjusted by controlling the DC-DC converter 210.

The rapid warm-up control portion 61d performs rapid warm-up control in the operation control process described later. Rapid warm-up control refers to the increase in the power generation loss, that is, the heat loss, brought about by operating the operation point of the fuel cell 10 at an operation point different from the I-V characteristic curve so as to perform a low-efficiency operation. By performing such a control, the waste heat amount of the fuel cell 10 may be increased, and as a result, the temperature of the fuel cell 10 may be rapidly increased up to a temperature suitable for the operation of the fuel cell 10, for example, 70 degrees Celsius to 100 degrees Celsius. The specific processing contents of rapid warm-up control and normal operation control are described later. In the operation control process described later, on the basis of a signal received from the temperature sensor 45, the present temperature acquisition portion 61e acquires the temperature value shown by the signal as the present temperature of the fuel cell 10 (hereinafter referred to as the "present temperature").

ROM 62 includes an I-P map storage portion 62a, a voltage upper-limit value map storage portion 62b, and a startup temperature value storage portion 62c. An I-P map is stored beforehand in the I-P map storage portion 62a. A voltage upper-limit value map is stored beforehand in the voltage upper-limit value map storage portion 62. Moreover, data showing the I-V characteristics of the fuel cell 10 is stored beforehand in the ROM 62. The ROM 62 corresponds to the storage apparatus in claims.

Figure 2:
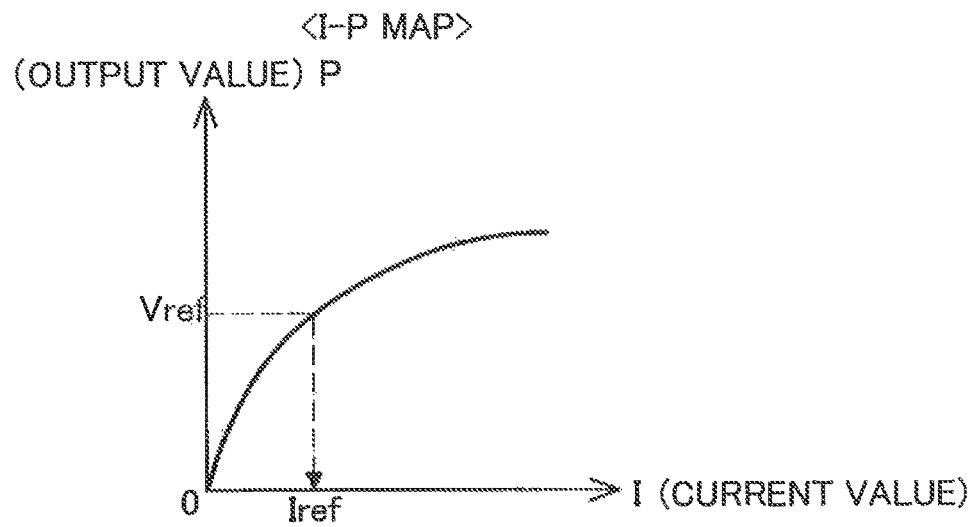
FIG. 2 is an explanatory diagram that schematically illustrates an I-P map.

FIG. 2 is an explanatory diagram that schematically illustrates an IP map. In FIG. 2, the horizontal axis shows a current value and the vertical axis shows an output value, that is, the electric power. In the I-P map, the required output Vref to the fuel cell 10, and the current value Iref of the fuel cell 10 that is required for obtaining the output are correlated. Such a map may be set as shown below, for example. That is, the I-P map may be set by identifying beforehand the I-V characteristic curve of the fuel cell 10, and thereafter, determining the current value of the intersecting point between the iso-power curve of the required output and the I-V characteristic curve while changing the required output.

Figure 3:
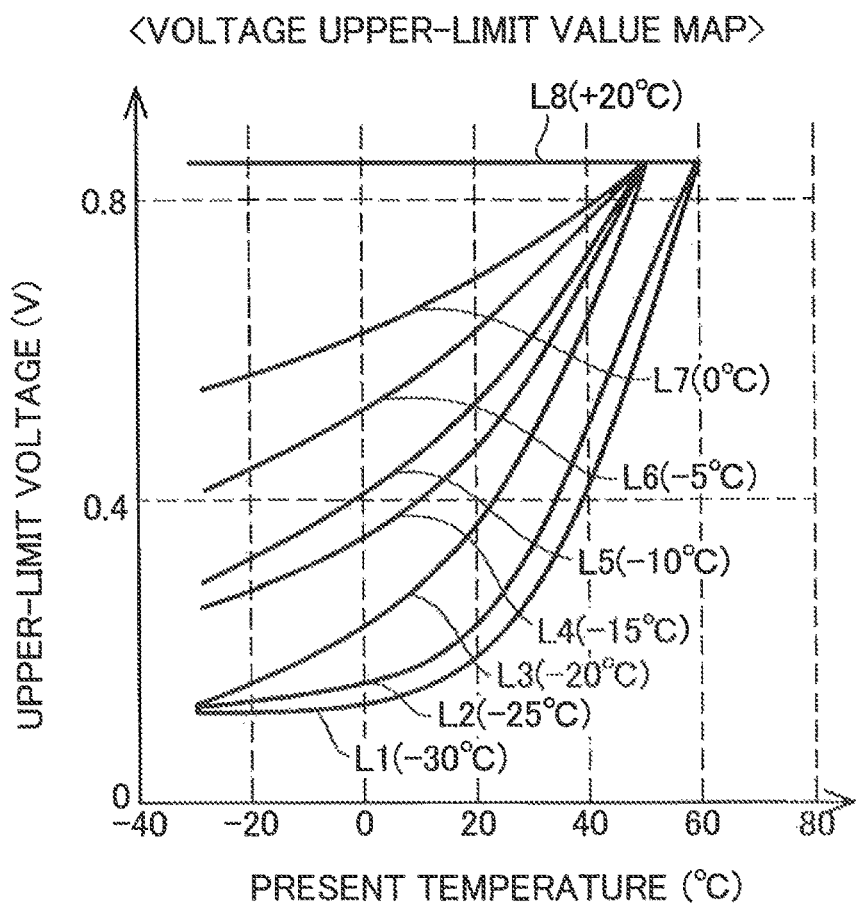
FIG. 3 is an explanatory diagram that schematically illustrates a voltage upper-limit map.

FIG. 3 is an explanatory diagram that schematically illustrates a voltage upper-limit map. In FIG. 3, the horizontal axis shows the present temperature and the vertical axis shows the voltage upper-limit value. The voltage upper-limit value implies the upper-limit value of the target operation point during the execution of rapid warm-up control. The target operation point is set in the operation control process described later. In the voltage upper-limit value map, the upper-limit voltage value corresponding to the present temperature is set beforehand. Moreover, the upper-limit voltage value corresponding to the present temperature is set according to the startup temperature. Specifically, in the present embodiment, the upper-limit voltage value corresponding to the present temperature is set according to a total eight types of startup temperatures, including −30 degrees Celsius, −25 degrees Celsius, −20 degrees Celsius, −15 degrees Celsius, −10 degrees Celsius, −5 degrees Celsius, 0 degrees Celsius, and +20 degrees Celsius. In FIG. 3, line L1 shows the upper-limit voltage value corresponding to the present temperature when the startup temperature is −30 degrees Celsius. Line L2 shows the upper-limit voltage value corresponding to the present temperature when the startup temperature is −25 degrees Celsius. Line L3 shows the upper-limit voltage value corresponding to the present temperature when the startup temperature is −20 degrees Celsius. Line L4 shows the upper-limit voltage value corresponding to the present temperature when the startup temperature is −15 degrees Celsius. Line L5 shows the upper-limit voltage value corresponding to the present temperature when the startup temperature is −10 degrees Celsius. Line L6 shows the upper-limit voltage value corresponding to the present temperature when the startup temperature is −5 degrees Celsius. Line L7 shows the upper-limit voltage value corresponding to the present temperature when the startup temperature is 0 degrees Celsius. Line L8 shows the upper-limit voltage value corresponding to the present temperature when the startup temperature is +20 degrees Celsius.

Each line L1 to L8 is set in a present, temperature range of −30 degrees Celsius or above and +60 degrees Celsius or below. As shown in FIG. 3, in the present temperature range of −30 degrees Celsius or above and around +50 degrees Celsius or below, if the present temperature is the same, a lower upper-limit voltage value is set as the startup temperature becomes low. Moreover, in the present temperature range that is higher than around +50 degrees Celsius, and +60 degrees Celsius or below, if the present temperature is the same, a lower upper-limit voltage value is set as the startup temperature becomes lower, in the two lines L1 and L2. Moreover, in the present temperature range of −30 degrees Celsius or above and around +50 degrees Celsius or below, a higher upper-limit voltage value is set as the present temperature becomes higher, in all other seven lines L1 to L7 excluding line L8. Moreover, in the present temperature range that is higher than around +50 degrees Celsius, and +60 degrees Celsius or below, a higher upper-limit voltage value is set as the present temperature becomes higher, in the two lines L1 and L2, As described above, the reason for a lower upper-limit voltage value being set as the startup temperature becomes low when the present temperature is the same in each line L1 to L8, and the reason for a higher upper-limit voltage value being set as the present temperature becomes high in each line L1 to L8 is explained below. If the fuel cell 10 is started in a low-temperature environment below the ice point, and operated at the same power generation efficiency, the time period until the present temperature exceeds the ice point becomes longer as the startup temperature becomes low, and therefore, the amount of water generated due to power generation within the time period becomes large. Therefore, the inventors of the application found out a new aspect that the lower the startup temperature, the water generated in each unit cell, for example, the water generated near the cathode-side catalyst layer during the time period from when the fuel cell starts until the present temperature exceeds the ice point freezes, possibly resulting in a decline in gas diffusion. Thus, in the present embodiment, the fuel cell 10 is operated at a lower efficiency by setting the output voltage value of the target operation point to a lower value as the startup temperature becomes lower, if the present temperature is the same. Therefore, if the startup temperature is relatively low when the present temperature is the same, the cathode-side electrochemical reaction that occurs as a result of generation of water is controlled so that the amount of generated water is reduced, and the waste heat amount is increased so as to prevent freezing of generated water, and control the decline in gas diffusion. In order to implement such a control, a relatively low upper-limit voltage value is set in the upper-limit voltage value map as the startup temperature becomes low. Moreover, the higher the present temperature, the lower the amount of heat required for heating up the fuel cell 10 becomes, and therefore, a relatively high upper-limit voltage value is set in the upper-limit voltage value map as the present temperature becomes high. Thus, the fuel cell 10 may be operated at as high an efficiency as possible, which enables a decline in fuel consumption. In the present embodiment, the fuel cell 10 is operated by changing the startup temperature, the operation point where freezing of the generated water may be prevented is determined through an experiment, etc., and the high-limit voltage value is set as the output voltage value of the operation point. In addition, in the above-described experiment, of the operation points where freezing of the generated water may be prevented, an operation point where the calorific value is relatively low, in other words, an operation point where the power generation efficiency is relatively high is determined, and the output voltage value of the operation point is set as the upper-limit voltage value. Thus, a decline in the fuel consumption of the fuel cell 10 may be controlled while controlling a decline in gas diffusion during startup.

Figure 4:
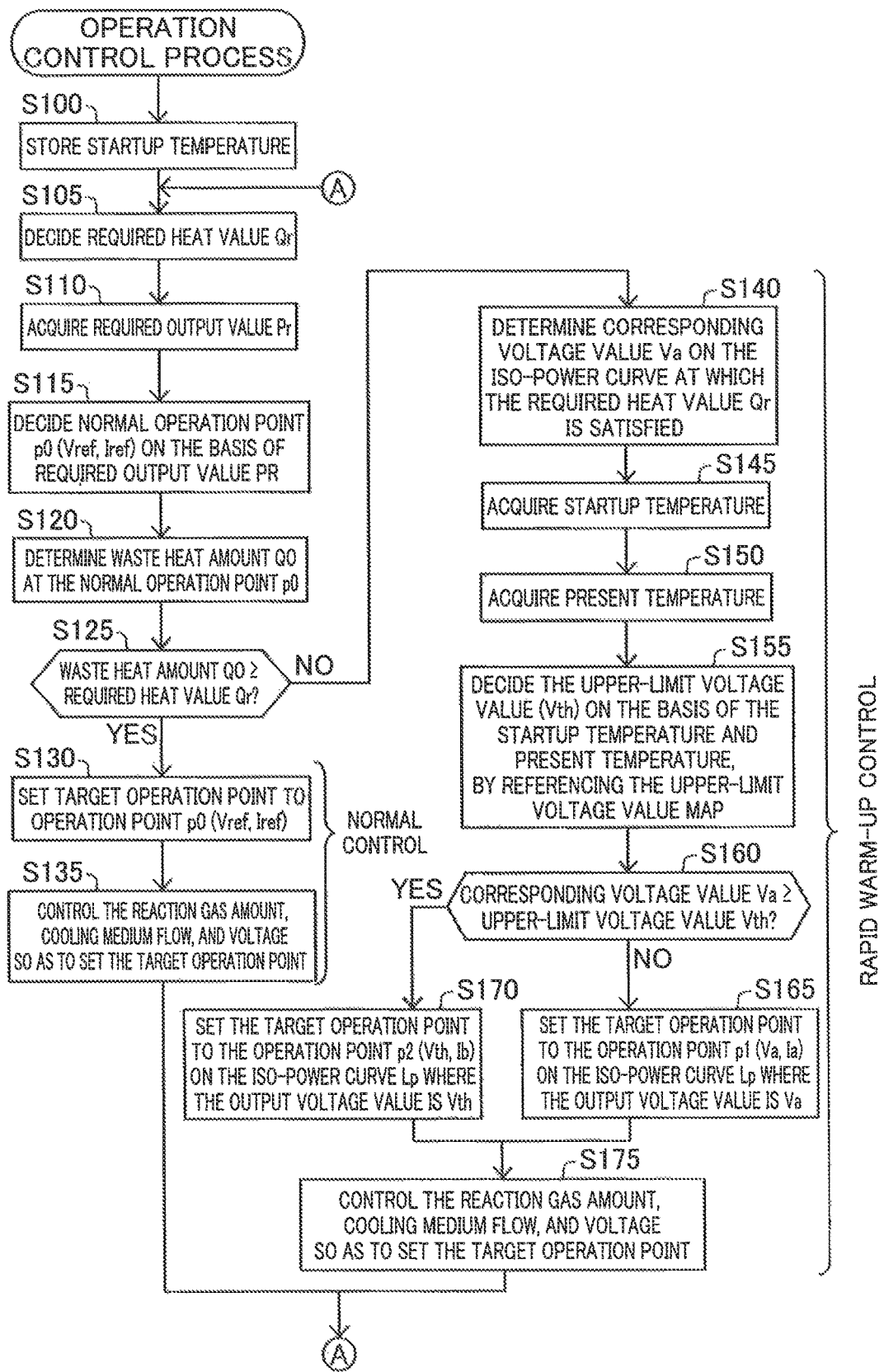
FIG. 4 is a flowchart showing a procedure of an operation control process according to the present embodiment.

A2. Operation Control Process:

FIG. 4 is a flowchart showing a procedure of an operation control process according to the present embodiment. The operation control process is executed when the fuel cell system 100 is started, and each component configuring the fuel cell system 100, such as the fuel cell 10, the air compressor 30, the radiator 40, and the operation control apparatus 60 is turned ON.

The startup temperature acquisition portion 61a acquires the startup temperature of the fuel cell 10 and stores it in the startup temperature value storage portion 62c (step S100). The target operation point setup portion 61b decides the required calorific value Qr for the fuel cell 10 (step S105). If, for example, the fuel cell vehicle has an air conditioner and the user performs the warm-up operation, the required calorific value for the fuel cell 10 may be determined by adding up the calorific value required for heating up the heater, and the calorific value required for increasing the temperature of the fuel cell 10 up to the above-described appropriate temperature, and maintaining it at that value. The calorific value required for heating up the heater may be determined with the help of well-known methods on the basis of the vehicle internal temperature, ambient temperature, ventilation rate, that is, the utilization of the inside air and outside air, amount of solar radiation, and the heat discharge from the windows. Moreover, the amount of heat required for heating up the fuel cell 10 up to an appropriate temperature and maintaining it at that value may be determined with the help of well-known methods on the basis of the present temperature and outside temperature of the fuel cell 10.

The target operation point setup portion 61b acquires the required output value Pr for the fuel cell 10 (step S110). As described above, since the normal operation control portion 61c computes the energy required by auxiliary devices such as the air compressor 30, and the motor 200, the target operation point setup portion 61b acquires the required energies from the normal operation control portion 61c as the required output value for the fuel cell 10.

The target operation point setup portion 61b decides the operation point p0 on the I-V characteristic curve that satisfies the required output value (hereinafter referred to as the "normal operation point") by referencing the I-P curve on the basis of the required output value Pr acquired in step S110 (step S115). Specifically, the target operation point setup portion 61b decides the current value Iref corresponding to the required output value Pr that is obtained in step S110, and then decides the voltage value Vref by dividing the required output value Pr with the decided current value Iref.

The target operation point setup portion 61b determines the waste heat amount Q0 of the fuel cell 10 when the fuel cell 10 operates at the normal operation point p0 decided in step S115 (step S120).

Figure 5:
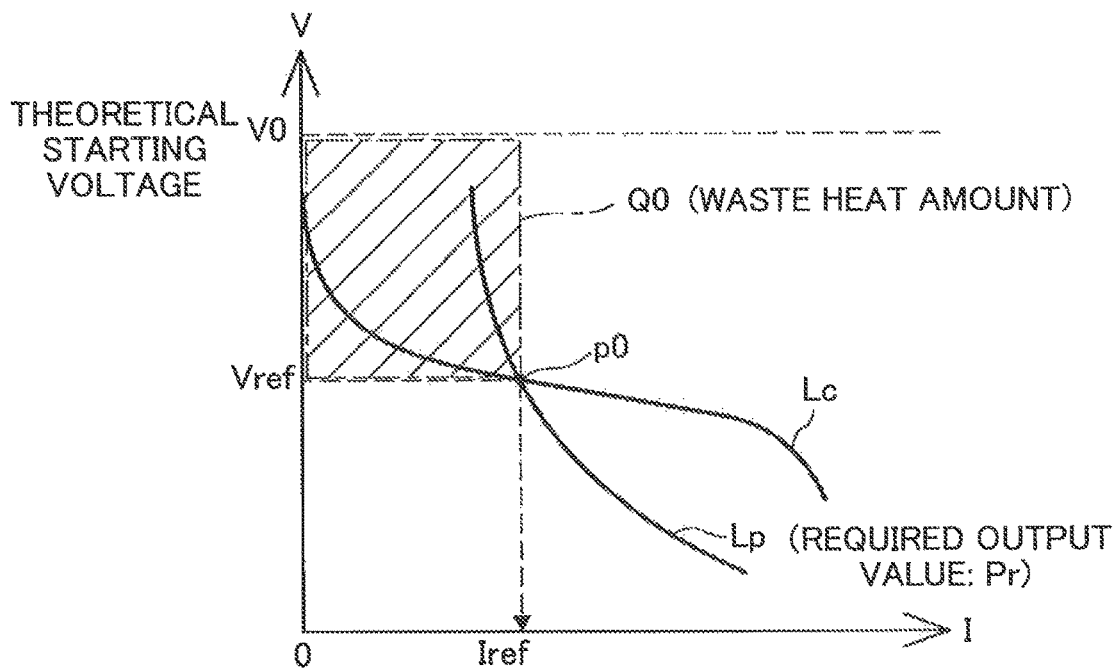
FIG. 5 is an explanatory diagram that schematically illustrates a method of determining a waste heat amount of a fuel cell during operation at a normal operation point.

FIG. 5 is an explanatory diagram that schematically illustrates a method of determining a waste heat amount of the fuel cell 10 during operation at the normal operation point p0. In FIG. 5, the horizontal axis shows the current value of the fuel cell 10, and the vertical axis shows the output voltage value of the fuel cell 10. Moreover, FIG. 5 shows the I-V characteristic curve Lc of the fuel cell 10, and the iso-power curve Lp of the required output value Pr. Moreover, in FIG. 5, the theoretical starting voltage V0 of the fuel cell 10 is shown by a dashed line. The theoretical stating voltage V0 of the fuel cell 10 is the voltage obtained by multiplying the number of unit cells configuring the fuel cell 10 with the maximum electromotive power of each unit cell (for example, 1.23 V).

As shown in FIG. 5, when the normal operation point p0 on the I-V characteristic curve Lc is determined, the waste heat amount Q0 of the fuel cell 10 when operation is performed at the normal operation point p0 corresponds to the area of the region shown by the dash-dot line in FIG. 5, and is determined by expression 1 shown below.

$$Q0 = Iref \times (V0 - Vref) \quad (1)$$

As shown in FIG. 4, the target operation point setup portion 61b determines whether or not the waste heat amount Q0 determined in step S120 is equal to or more than the required calorific value Qr decided in step S105 (step S125).

If it is determined that the waste heat amount is equal to or more than the required calorific value Qr (step S125: YES), the target operation point setup portion 61b sets the target operation point of the fuel cell 10 to the normal operation point p0 (output voltage value: Vref, output current value: Iref) (step S130). To ensure that the operation point is set to the normal operation point p0, which is the target operation point, the normal operation control portion 61c controls the amount of reaction gas, the cooling medium flow rate, and the voltage of the fuel cell 10 (step S135). The above-described step S130 and step S135 correspond to normal control. Normal control implies a control according to which the fuel cell 10 is operated in a way that the operation point of the fuel cell 10 exists on the I-V characteristic curve so that the power generation loss, that is, the heat loss is minimized, and a high-efficiency operation is performed. After the completion of step S135, the operation returns to the above-described step S105.

In the above-described step S125, if it is determined that the waste heat amount Q0 is not more than the required calorific value Qr, that is, the waste heat amount Q0 is less than the required calorific value Qr (step S125: NO), the target operation point setup portion 61b determines the voltage value (hereinafter referred to as the "corresponding voltage value") Va on the iso-power curve of the required output value Pr at which the required calorific value Qr is satisfied (step S140).

Figure 6:
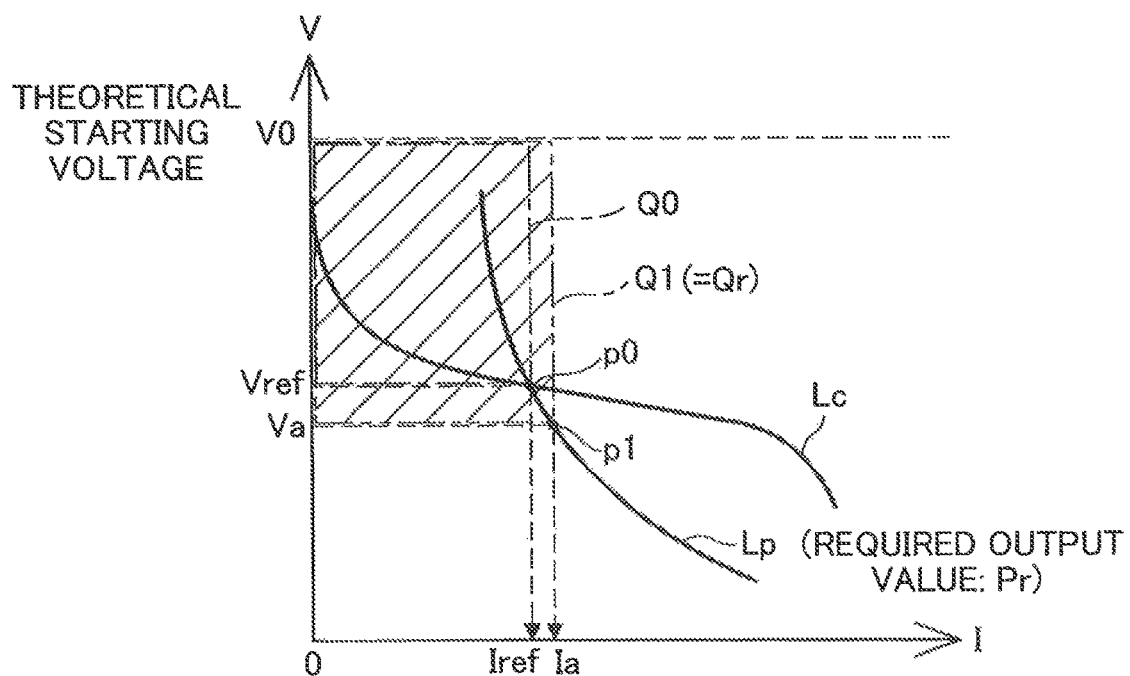
FIG. 6 is an explanatory diagram that schematically illustrates an example of the processing result of step S140.

FIG. 6 is an explanatory diagram that schematically illustrates an example of the processing result of step S140. The horizontal axis and the vertical axis of FIG. 6 are the same as the horizontal axis and the vertical axis of FIG. 5, and therefore, the detailed explanation has been omitted. Moreover, in FIG. 6, the curve Lc, the curve Lp, and the operation point p0 are the same as the curve Lc, the curve Lp, and the operation point p0 shown in FIG. 5, and therefore, the detailed explanation has been omitted.

In the example shown in FIG. 6, if the waste heat amount Q0 when the operation point is the normal operation paint p0 is less than the required calorific value Qr, the operation point p1 on the iso-power curve Lp (output voltage value: Va, output current value: Ia) is determined as the target operation point. The waste heat amount Q1 of the fuel cell 10 during operation at the operation point p1 is more than the above-described Q0, and the required calorific value Qr is the same. Therefore, in step S140 the output voltage value of the operation point p1 is determined as the corresponding voltage value Va.

The target operation point setup portion 61b acquires the startup temperature stored in the startup temperature value storage portion 62c (step S145). The present temperature acquisition portion 61e acquires the present temperature (step S150). The target operation point setup portion 61b decides the upper-limit voltage value Vth on the basis of the startup temperature and the present temperature, by referencing the voltage upper-limit value map stored in the voltage upper-limit value map 62b (step S155).

As described above, since the upper-limit voltage value map is a map in which the startup temperature, the present temperature, and the upper-limit voltage are correlated, the upper-limit voltage value may be determined on the basis of the startup temperature obtained in step S145 and the present temperature obtained in step S150. For example, as shown in FIG. 3, if the startup temperature is −15 degrees Celsius (line L4) and the present temperature is +10 degrees Celsius, approx. 0.4 V is decided as the upper-limit voltage value.

The target operation point setup portion 61b compares the corresponding voltage value Va determined in step S140, and the upper-limit voltage value Vth decided in step S155 and determines whether or not the corresponding voltage value Va is equal to or above the upper-limit voltage value Vth (step S160).

If the corresponding voltage value Va is not equal to or above the upper-limit voltage value Vth (step S160: NO), the target operation point setup portion 61b sets the operation point on the iso-power curve Lp where the output voltage value is the corresponding voltage value Va, as the target operation point (step S165). If the corresponding voltage value Va is not equal to or above the upper-limit voltage value Vth, then by setting the output voltage value of the target operation point as the corresponding voltage value Va, not only the amount of generated water may be reduced, but the waste heat amount may be increased so that freezing of the generated water may be controlled as compared to the case when the output voltage value of the target operation point is set in the upper-limit voltage value Vth. Therefore, in the present embodiment, the target operation point is set to the operation point on the iso-power curve Lp where the output voltage value is the corresponding voltage value Va, that is, the target operation point is set to the operation point p1 shown in FIG. 6.

In contrast, in the above-described step S160, if the corresponding voltage value Va is equal to or above the upper-limit voltage value Vth (step S160: YES), the target operation point setup portion 61b sets the operation point on the iso-power curve Lp where the output voltage value is the upper-limit voltage value Vth as the target operation point (step S170).

Figure 7:
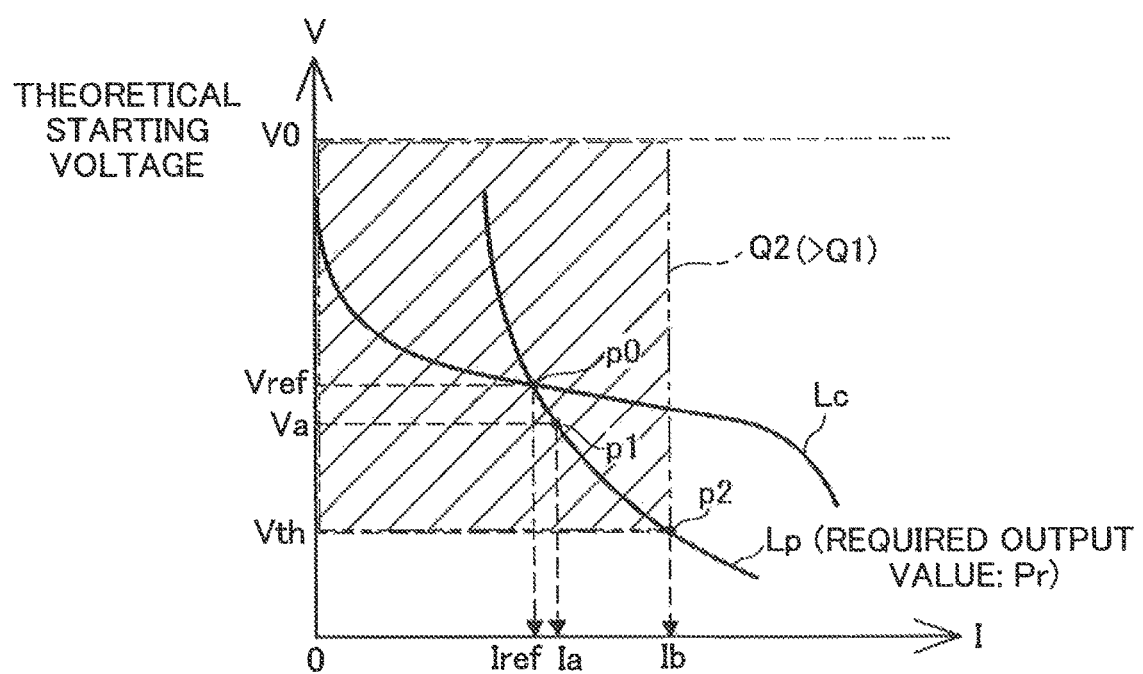
FIG. 7 is an explanatory diagram showing an example of a target operation point set in step S170.

FIG. 7 is an explanatory diagram showing an example of a target operation point set in step S170. The horizontal axis and the vertical axis of FIG. 7 are the same as the horizontal axis and the vertical axis of FIG. 6, and therefore, the detailed explanation has been omitted. Moreover, the curve Lp, the curve Lc, the normal operation point p0, and the operation point p1 in FIG. 7 are the same as the curve Lp, the curve Lc, the normal operation point p0, and the operation point p1 of FIG. 6, and therefore, the detailed explanation has been omitted.

If the fuel cell 10 is operated at the operation point p2 (output current value: Ib) where the output voltage value is the upper-limit voltage value Vth, the waste heat amount Q2 of the fuel cell 10 is more than the waste heat amount Q1 when the fuel cell 10 is operated at the operation point p1 shown in FIG. 6. As described above, the upper-limit voltage value Vth is set as the output voltage value at which freezing of the generated water due to operation of the fuel cell 10 may be prevented. Therefore, the target operation point may be set to the operation point p2, and freezing of the generated water may be prevented by operating the fuel cell 10 at the operation point p2.

In the above-described step S165 or step S170, when the target operation point is set, the rapid warm-up control portion 61d controls the reaction gas amount, the cooling medium flow rate, and the voltage of the fuel cell 10 so that the operation point becomes the target operation point, that is, the operation point p1 or the operation point p2 (step S175). For example, by reducing the supply amount of air, which is the oxidizing gas, the power generation efficiency may be reduced, and the fuel cell 10 may be operated at the operation point separated from the I-V characteristic curve Lc. After the completion of step S175, the operation returns to the above-described step S105. The above-described steps S140 to S175 correspond to rapid warm-up control.

In the fuel cell system 100 of the present embodiment described above, because an operation point, which has a relatively low output voltage value as the startup temperature becomes low, is set as the target operation point if the present temperature is the same, the cathode-side electrochemical reaction that occurs in each cell until the present temperature exceeds the ice point may be suppressed thus the amount of generated water is reduced, and the waste heat amount may be increased thus freezing of the generated water is prevented. Therefore, the decline in the diffusion of the gas during startup of the fuel cell 10 may be prevented. In addition, because an operation point, which has a relatively high output voltage value as the present temperature becomes high, is set as the target operation point if the startup temperature is the same, the fuel cell 10 may be made to perform a high-efficiency operation as compared to a configuration in which the output voltage value of the target operation point is constant regardless of the present temperature. Therefore, a decline in the fuel consumption may be prevented. Moreover, because an operation point on the iso-power curve of the required output value Pr is set as the target operation point, the fuel cell 10 may be operated so as to satisfy the required output.

In addition, because the waste heat amount is increased by performing rapid warm-up control when the waste heat amount Q0 is less than the required calorific value Qr, the present temperature of the fuel cell 10 may be quickly increased.

B. Modifications

B1: Modification 1:

The setting contents of the voltage upper-limit value map in the above-described embodiment are simply an example, and may be appropriately changed. For example, in the voltage upper-limit value map shown in FIG. 3, the setting of a relatively low upper-limit voltage value as the startup temperature becomes low, when the present temperature is the same, is performed when the present temperature range was −30 degrees Celsius or above, and around +50 degrees Celsius or below, however, the present invention is not limited thereto, and a relatively low upper-limit voltage value may be set as the startup temperature becomes low, as long as the present temperature is the same in any arbitrarily temperature range. Moreover, as shown in FIG. 3, in the seven lines L1 to L7 excluding line L8, a relatively high upper-limit voltage is set as the present temperature became high, in the range of approx. +50 degrees Celsius or below, but the present invention is not limited thereto, and same as line L8, these lines may be considered as lines indicating a predetermined fixed value regardless of the present temperature.

B2: Modification 2:

In the operation control process according to the above-described embodiment, when it is determined that the waste heat amount Q0 is not equal to or more than the required calorific value Qr, that is, the waste heat amount Q0 is less than the required calorific value Qr, steps S140 to S175 are performed, but the present invention is not limited thereto. In step S125, if it is determined that the waste heat amount Q0 is not more than or equal to the required calorific value Qr (step S125: NO), the present temperature of the fuel cell 10 may be acquired, and when the present temperature is 0 degrees Celsius or below, the above-described steps S140 to S175 may be executed, and when the present temperature is above 0 degrees Celsius, these steps may not be executed. In the present configuration, when the present temperature is above 0 degrees Celsius, for example, the operation point on the iso-power curve of the required output value Pr where the required calorific value Qr is satisfied is determined, and the reaction gas amount, cooling medium flow rate, and voltage of the fuel cell 10 may be controlled by using the operation point as the target operation point. When the present temperature is above 0 degrees Celsius, the possibility of freezing of generated water in each unit cell is low, and therefore, the decline in gas diffusion may be prevented even without performing rapid warm-up control. Therefore, by adopting the configuration according to the above-describe modification, the chances of performing low-efficiency operation are reduced, and a decline in fuel consumption may be prevented. In addition, when the present temperature is 0 degrees Celsius or below, and the possibility of freezing of the generated water in each unit cell is high, the above-described rapid warm-up control is performed, because of which the decline in gas diffusion due to freezing of the generated water may be prevented with higher certainty.

Figure 8A:
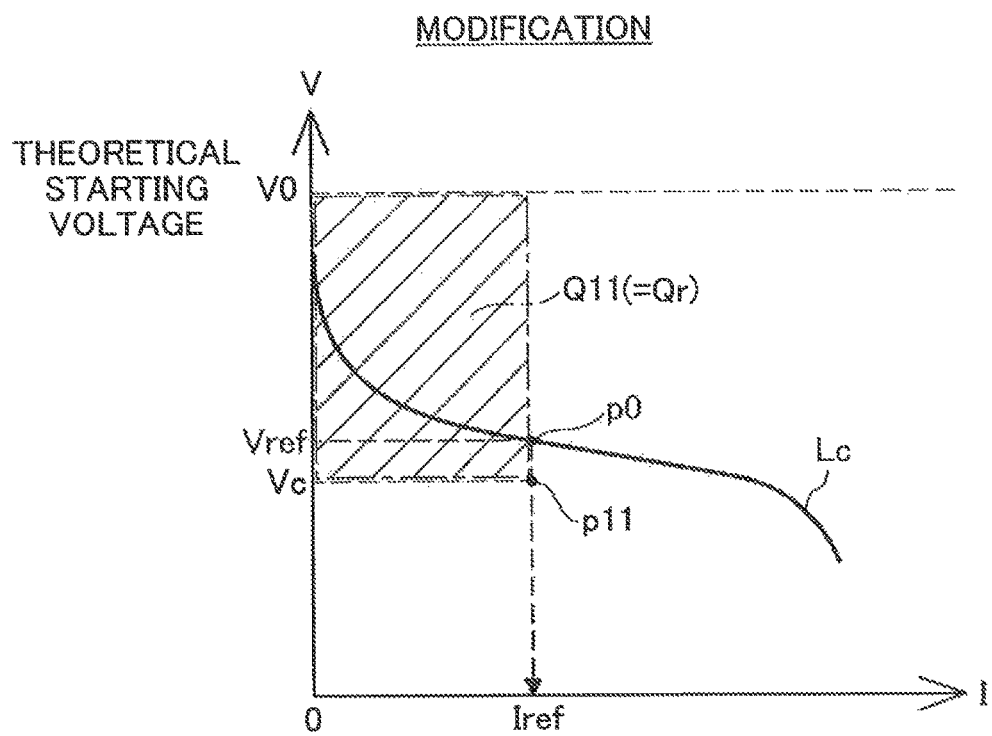
FIG. 8A is an explanatory diagram that schematically illustrates a first form of the setting of a target operation point in a modification.
Figure 8B:
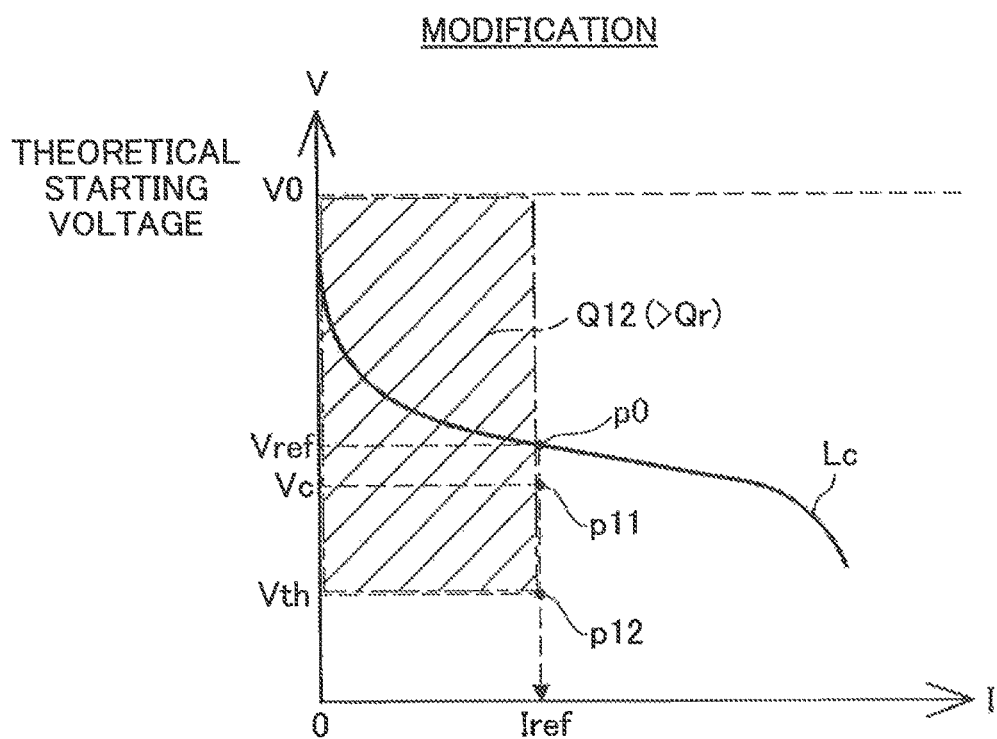
FIG. 8B is an explanatory diagram that schematically illustrates a second form of the setting of a target operation point in a modification.

B3: Modification 3:

In the above-described embodiment, the operation point on the iso-power curve of the required output value Pr is set as the target operation point, but the present invention is not limited thereto. FIG. 8A is an explanatory diagram that schematically illustrates a first aspect of the setting of the target operation point in the modification. FIG. 8B is an explanatory diagram that schematically illustrates a second aspect of the setting of the target operation point in the modification. The horizontal axis and the vertical axis of FIG. 8A and FIG. 8B are the same as the horizontal axis and the vertical axis of FIG. 5, and therefore, the detailed explanation has been omitted. Moreover, the curve Lc and the normal operation point p0 in FIG. 8A and 8B are the same as the curve Le and the normal operation point p0 of FIG. 5, and therefore, the detailed explanation has been omitted.

According to the aspect in FIG. 8A, if it is determined that the waste heat amount Q0 is not equal to or more than the required calorific value Qr (step S125: NO), the operation point p11 is set as the target operation point, and the reaction gas amount, the cooling medium flow rate, and the voltage of the fuel cell 10 are controlled so that the operation point p11 is realized. The operation point p11 is the operation point where a current value same as the output current value Iref of the normal operation point p0 is set for the output current value. The waste heat amount Q11 of the fuel cell 10 when operation is performed at the operation point p11 matches the required calorific value Qr. Therefore, the output voltage value of the operation point p11 may be determined from the output current value Iref and the required calorific value Qr. The output voltage value Vc of the operation point p11 is less than the output voltage value Vref of the normal operation point p0.

In the aspect of FIG. 8B, the setting aspect of the target operation point when the output voltage value Vc of the operation point p11 is more than the upper-limit voltage value Vth is illustrated. According to this aspect, the operation point p12, where the output current value is the same as the output current value Iref of the normal operation point p0 and the operation point p11, and the output voltage value is the voltage value Vth, is set as the target operation point. The waste heat amount Q12 of the fuel cell 10 when operation is performed at the operation point p12 is more than the waste heat amount Q11 shown in FIG. 8A, The aspect of FIG. 8B and the above-described aspect of FIG. 8A may be implemented in a single process flow. That is, same as the above-described embodiment, first of all, an output current value same as the output current value of the normal operation point p0 is set, the operation point where a calorific value matching the required calorific value Qr is obtained is determined, and then it is determined if the output voltage value at the operation point is equal to or more than the upper-limit voltage value Vth. Also, if the output voltage value of the determined operation point is equal to or more than the upperlimit voltage value Vth, the operation point p12 may be set as the target operation point as shown in the aspect in FIG. 8B. In contrast, if the output voltage value of the determined operation point is less than the upper-limit voltage value Vth, the operation point p11 may be set as the target operation point as shown in the aspect in FIG. 8A.

In the configuration according to the above-described modification, the upper-limit voltage value Vth, for example, may be determined as a ratio with respect to the output voltage value Vref of the normal operation point p0. At this point, as long as the present temperature is the same, a relatively low ratio may be set as the startup temperature becomes low.

B4: Modification 4:

In the above-described embodiment, the upper-limit voltage value Vth is determined by using the upper-limit voltage Vth, but in place of the map, the upper-limit voltage value Vth may be derived by a calculation expression in which the startup temperature and the present temperature are used as variables. Moreover, as a modification of this configuration, the output voltage value of the target operation point may be determined directly by the calculation expression without determining the corresponding voltage value Va and the upper-limit voltage value Vth. In such a configuration, as long as the present temperature is the same, a calculation expression by which a relatively low voltage value for a low enough startup temperature may be derived as the output voltage value of the target operation point may be used.

B5: Modification 5:

In the above-described embodiment, in step S135 and step S175, the reaction gas amount, the cooling medium flow rate, and the voltage of the fuel cell 10 were controlled so that the operation point became the target operation point, but of these, one or two controls may be omitted. That is, to enable the operation point to become the target operation point, at least one of the reaction gas amount, the cooling medium flow rate, and the voltage of the fuel cell 10 may be controlled.

B6: Modification 6:

In the above-described embodiment, the fuel cell system 100 is used as a system for supplying the drive power mounted on a fuel cell vehicle, but the present invention is not limited thereto. For example, in place of a fuel cell vehicle, the fuel cell system 10 may be mounted on any other moving body that requires drive power, such as an electric car, and used. Moreover, the fuel cell system 10 may be used as a fixed source of power, for example, it may be installed indoor or outdoor in an office or home, and used. Moreover, each unit cell included in the fuel cell 10 was a unit cell for a polymer electrolyte fuel cell, but the unit cell may be configured as a unit cell for various fuel cells, such as a phosphoric acid fuel cell, a molten carbonate type fuel cell, and a solid oxide fuel cell.

The present invention is not restricted to the above-described embodiments and modifications, and may be implemented by a diversity of other configurations without departing from the scope of the invention. For example, the technical characteristics described in the embodiments and modifications corresponding to the technical characteristics in each form described in the SUMMARY may be appropriately substituted or combined together in order to resolve some or all of the above-described issues, or to realize some or all of the above-described effects. Moreover, if the technical characteristics are not described as compulsory in the SPECIFICATION, they may be deleted appropriately.

What is claimed is:

1. An operation control method of a fuel cell, comprising:

acquiring a startup temperature of the fuel cell;

acquiring a present temperature of the fuel cell;

setting a target operation point of the fuel cell identified by an output voltage value and an output current value of the fuel cell based on the startup temperature and the present temperature; and controlling at least one of a flow rate of a reaction gas supplied to the fuel cell, and an output voltage of the fuel cell so that an operation point of the fuel cell becomes the target operation point, wherein the target operation point is an operation point at the time of a warm-up operation, and the setting the target operation point includes setting the target operation point according to the present temperature and setting the output voltage value of the target operation point to a lower value as the startup temperature becomes lower and the present temperature remains the same.

2. The operation control method of the fuel cell according to claim 1, wherein the setting the target operation point includes setting the output voltage value of the target operation point to a higher value when the present temperature is high as compared to the case when the present temperature is low and the startup temperature remains the same.

3. The operation control method of the fuel cell according to claim 1, wherein the setting the target operation point is executed when the startup temperature is 0 degrees Celsius or below.

4. The operation control method of the fuel cell according to claim 1, wherein the setting the target operation point includes setting the target operation point so that the output voltage value of the target operation point becomes less than the output voltage value of a normal operation point that is an intersecting point of an iso-power curve passing through the target operation point and a current-voltage characteristic curve of the fuel cell.

5. The operation control method of the fuel cell according to claim 4, wherein the controlling includes a process where as compared to a case in which the operation point of the fuel cell matches the normal operation point, the flow rate of the reaction gas supplied to the fuel cell is reduced, and a low-efficiency operation in which the power loss is high as compared to the operation at the normal operation point is executed.

6. The operation control method of the fuel cell according to claim 4, further comprising:

storing beforehand, in a storage apparatus, an upper-limit value of an output voltage value of the target operation point corresponding to the startup temperature and the present temperature, wherein the storing includes storing a low value as the upper-limit value in the storage apparatus when the startup temperature is low as compared to the case when the startup temperature is high, if the present temperature is the same, and the setting the target operation point includes setting the target operation point so that the output voltage value of the target operation point becomes equal to or less than the upper-limit value of the output voltage value that is identified by the startup temperature and the present temperature.

* * * * *